(12) United States Patent
McKenzie et al.

(10) Patent No.: US 11,647,014 B2
(45) Date of Patent: May 9, 2023

(54) IDENTITY AUTHENTICATION BASED ON DATA FROM INTERNET OF THINGS DEVICES

(71) Applicant: International Business Machines Corporation, Armonk, NY (US)

(72) Inventors: Stephen J. McKenzie, Mudgeeraba (AU); Narayana A. Madineni, Southport (AU); Simon D. McMahon, GoldCoast (AU); Pranab Agarwal, Oxenford (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/793,630

(22) Filed: Feb. 18, 2020

(65) Prior Publication Data

US 2021/0258296 A1 Aug. 19, 2021

(51) Int. Cl.
*G16Y 40/50* (2020.01)
*H04L 9/40* (2022.01)

(52) U.S. Cl.
CPC ............ *H04L 63/083* (2013.01); *G16Y 40/50* (2020.01)

(58) Field of Classification Search
CPC .............................. H04L 63/083; G16Y 40/50
See application file for complete search history.

(56) References Cited

U.S. PATENT DOCUMENTS

| 10,231,122 B2 | 3/2019 | Childress et al. |
| 10,284,567 B2 | 5/2019 | Todasco et al. |
| 10,334,439 B2 | 6/2019 | Verma et al. |
| 10,354,465 B2 | 7/2019 | Daly et al. |
| 10,693,872 B1* | 6/2020 | Larson .................. H04L 9/3228 |
| 10,880,284 B1* | 12/2020 | Hitchcock ............. H04L 63/102 |
| 2003/0154406 A1* | 8/2003 | Honarvar ........... G06Q 20/4014 726/10 |
| 2016/0315929 A1* | 10/2016 | Childress .............. H04W 12/06 |
| 2018/0242149 A1* | 8/2018 | Verma ................... H04L 12/282 |

OTHER PUBLICATIONS

No Author, "Multi-Factor Authentication for IoT," Nordic Semiconductor, Oct. 24, 2018. Retrieved from the Internet: https://blog.nordicsemi.com/getconnected/multi-factor-authentication-for-iot [retrieved on Feb. 18, 2020].

(Continued)

*Primary Examiner* — Michael Roswell
(74) *Attorney, Agent, or Firm* — Troutman Pepper Hamilton Sanders LLP (57) ABSTRACT

A computer-implemented method for identity authentication in a data processing system, including: receiving, by the processor, an authentication request from a user; receiving, by the processor, real-time data from one or more Internet of Things (IoT) devices associated with the user; generating, by the processor, one or more questions based on the real-time data; receiving, by the processor, one or more responses to the one or more questions from the user; comparing, by the processor, the one or more responses from the user with one or more correct answers identified by the processor. If the one or more responses match the one or more correct answers, providing, by the processor, the user with a successful identity authentication.

18 Claims, 7 Drawing Sheets

(56) References Cited

OTHER PUBLICATIONS

Giffith, Eric, "Two-Factor Authentication: Who Has It and How to Set It Up," PCMag Australia, Mar. 12, 2019. Retrieved from the Internet: https://au.pcmag.com/gallery/61103/two-factor-authentication-who-has-it-and-how-to-set-it-up [retrieved on Feb. 18, 2020].

No Author, "Multi-Factor Authentication (MFA)," SurePassID, 2019. Retrieved from the Internet: https://surepassid.com/products/multi-factor-authentication-mfa/?doing_wp_cron=1582047523.4181358814239501953125 [retrieved on Feb. 18, 2020].

FIDO: 1.0 Final Specifications, dated Dec. 1, 2014 https://fidoalliance.org/whitepaper-on-fido-1-0-final-specifications/.

FIDO: Bluetooth & NFC Transport for Fido U2F, dated Jul. 1, 2015 https://media.fidoalliance.org/wp-content/uploads/BluetoothNFCTransport for FIDO U2F.pdf.

FIDO UAF Metadata Service, dated Feb. 1, 2016 https://media.fidoalliance.org/wp-content/uploads/FIDO_Alliance_Metadata_Service_White_Paper_02122016.pdf.

FIDO: Response to the European Banking Authority (EBA) Discussion Paper on Future Draft Regulatory Technical Standards on Strong Customer Authentication and Secure Communication Under the Revised Payment Services Directive (PSD2), dated Feb. 1, 2016; https://media.fidoalliance.org/wp-content/uploads/FIDO-ALLIANCE-Response-to-EBA-Consultation-on-PSD2-and-Exemptions-FINAL-8.10.18.pdf.

FIDO: Leveraging FIDO Standards to Extend the PKI Security Model in United States Government Agencies, Mar. 1, 2017; https://media.fidoalliance.org/wp-content/uploads/White-Paper-Leveraging-FIDO-Standards-to-Extend-the-PKI-Security-Model-in-US-Govt-Agencies.pdf.

FIDO Alliance Letter Regarding Payment Services Directive 2, dated Aug. 1, 2017; https://media.fidoalliance.org/wp-content/uploads/FIDO_Alliance_Letter_Regarding_PSD2-SCA.pdf.

FIDO & PSD2: Meeting the needs for Strong Consumer Authentication, dated Sep. 1, 2017; https://media.fidoalliance.org/wp-content/uploads/FIDO-PSD2-white-paper-FINAL.pdf.

FIDO: Korean FIDO Deployment Case Study-Accredited Certification System for Safe Usage of Accredited Certificate using FIDO in Smartphone in Korea (K-FIDO), dated Sep. 1, 2017; https://media.fidoalliance.org/wp-content/uploads/FIDO-Deployment-Case-Study-K-FIDO_170905.pdf.

FIDO: Enterprise Adoption Best Practices—Managing FIDO Credential Lifecycle for Enterprises, dated Apr. 28, 2018 https://media.fidoalliance.org/wp-content/uploads/Enterprise_Adoption_Best_Practices_Lifecycle_FIDO_Alliance.pdf.

FIDO: Authentication and the General Data Protection Regulation, dated May 28, 2018; https://media.fidoalliance.org/wp-content/uploads/FIDO_Authentication_and_GDPR_White_Paper_May2018-1.pdf.

FIDO: Hardware-backed Keystore Authenticators (HKA) on Android 8.0 or Later Mobile Devices, dated Jun. 28, 2018 https://media.fidoalliance.org/wp-content/uploads/Hardware-backed_Keystore_White_Paper_June2018.pdf.

FAQ on FIDO Relevance for the GDPR, dated Sep. 1, 2018; https://media.fidoalliance.org/wp-content/uploads/FIDO_Alliance_GDPR_FAQ_September2018.pdf.

FIDO & PSD2—Providing for a Satisfactory Customer Journey, dated Sep. 13, 2018; https://media.fidoalliance.org/wp-content/uploads/FIDO-PSD2_Customer_Journey_White_Paper.pdf.

FIDO: Enterprise Adoption Best Practices—Integrating FIDO & Federation Protocols, dated Nov. 28, 2018 https://media.fidoalliance.org/wp-content/uploads/Enterprise_Adoption_Best_Practices_Federation_FIDO_Alliance.pdf.

Fido: Uaf and PKI in Asia-Case Study and Recommendations, dated Nov. 28, 2018; https://media.fidoalliance.org/wp-content/uploads/FIDO-UAF-and-PKI-in-Asia-White-Paper.pdf.

FIDO: How FIDO Standards Meet PSD2's Regulatory Technical Standards Requirements On Strong Customer Authentication, dated Dec. 20, 2018; https://media.fidoalliance.org/wp-content/uploads/2019/01/How_FIDO_Meets_the_RTS_Requirements_December2018.pdf.

FIDO: Recommended Account Recovery Practices for FIDO Relying Parties, dated Feb. 6, 2019 https://fidoalliance.org/recommended-account-recovery-practices/.

FIDO and PKI Integration in the Enterprise, dated Apr. 30, 2019; https://media.fidoalliance.org/wp-content/uploads/2019/05/white-paper-pki-and-fido-in-the-enterprise-2019.pdf.

\* cited by examiner

IDENTITY AUTHENTICATION BASED ON DATA FROM INTERNET OF THINGS DEVICES

TECHNICAL FIELD

The present application generally relates to identity authentication, and more particularly, to identity authentication using real-time data from the Internet of Things (IoT) devices.

BACKGROUND

Generally, there are three main factors used for authentication, which are "something you know," "something you have," and "something you are."

"Something you know" is a question/response mechanism, which requires a user to provide an exact answer to a specific question to authenticate. Examples of this factor can be a password, a phrase or a security question. The problem with this factor is that it is difficult to remember the password, phrase, and answer to any security question. The authentication can be successful only if input from the user exactly matches the password, phrase, and answer.

"Something you have" is a physical item such as a hardware token or key to unlock a specific physical lock or to provide an answer to a question. If a user loses the token or if the token is damaged or runs out of battery, then the user cannot perform authentication.

"Something you are" is to authenticate using a personal biometric feature, such as a retina scan, a fingerprint or facial scan. This factor requires a scanner and is often vulnerable to new attacks which fake the biometric feature, or vulnerable to false negatives due to, e.g., presence/absence of a beard or an environmental factor, such as a lighting condition or humidity.

It is desired to provide a new system and method for identity authentication to solve the above problems.

SUMMARY

Embodiments provide a computer-implemented method for identity authentication in a data processing system comprising a processor and a memory comprising instructions which are executed by the processor, the method including: receiving, by the processor, an authentication request from a user; receiving, by the processor, real-time data from one or more Internet of Things (IoT) devices associated with the user; generating, by the processor, one or more questions based on the real-time data; receiving, by the processor, one or more responses to the one or more questions from the user; comparing, by the processor, the one or more responses from the user with one or more correct answers identified by the processor. If the one or more responses match the one or more correct answers, providing, by the processor, the user with a successful identity authentication.

Embodiments further provide a computer-implemented method, further comprising: providing, by the processor, a confidence index indicating a matching degree between the one or more responses and the one or more correct answers. If the confidence index is less than a predefined confidence index threshold, generating, by the processor, one or more additional questions based on the real-time data; receiving, by the processor, one or more additional responses to the one or more additional questions from the user; and if the confidence index is equal to or more than the predefined confidence index threshold, providing, by the processor, the user with a successful identity authentication.

Embodiments further provide a computer-implemented method, further comprising: registering, by the processor, the one or more IoT devices.

Embodiments further provide a computer-implemented method, the step of registering further comprising: receiving, by the processor, information of the one or more IoT devices from the user; contacting, by the processor, the one or more IoT devices based on the information; receiving, by the processor, an authorization of using the one or more IoT devices from the user; relaying, by the processor, the authorization to the one or more IoT devices; and receiving, by the processor, a notification that an access to the one or more IoT devices is granted.

Embodiments further provide a computer-implemented method, the step of registering further comprising: receiving, by an authentication server, information of the user; requesting, by the authentication server, to access information of the one or more IoT devices from an IoT server; and if the information of the one or more IoT devices is available from the IoT server, receiving, by an authentication server, a notification that an access to the one or more IoT devices is granted.

Embodiments further provide a computer-implemented method, wherein the one or more IoT devices are private IoT devices including one or more of a backyard camera, a refrigerator, a toaster, a car, and a television.

Embodiments further provide a computer-implemented method, wherein the one or more IoT devices are commercial or public IoT devices.

In another illustrative embodiment, a computer program product comprising a computer usable or readable medium having a computer readable program is provided. The computer readable program, when executed on a processor, causes the processor to perform various ones of, and combinations of, the operations outlined above with regard to the method illustrative embodiment.

In yet another illustrative embodiment, a system is provided. The system may comprise a full question generation processor configured to perform various ones of, and combinations of, the operations outlined above with regard to the method illustrative embodiment.

Additional features and advantages of this disclosure will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION OF EXEMPLARY EMBODIMENTS

The present invention may be a system, a method, and/or a computer program product for performing an identity authentication. The computer program product may include a computer-readable storage medium (or media) having computer-readable program instructions thereon for causing a processor to carry out aspects of the present invention.

The system, method, and/or computer program product can generate questions or challenges in real-time based on available information from the personal or public Internet of things (IoT) devices to provide stronger authentication. The Internet of Things, or IoT, refers to a large number of physical devices around the world that are connected to the internet, all collecting and sharing data. An IoT device refers to a physical device connected to the internet. An IoT device can communicate with other IoT devices or/and an IoT server, and can be controlled by another IoT device or/and an IoT server.

No physical authentication token is required at the time of authentication. In an embodiment, accessible commercial or public IoT devices, private registered IoT devices, or a random combination thereof can be used to generate questions and validate answers to those questions. The data collected by the IoT devices can be used to create authentication questions such as "what specific items are in the refrigerator" or "what are the most recent items added in the refrigerator." The answers to these questions are only known to the IoT devices/server and the user who interacts with the IoT devices on a daily basis.

Figure 1:
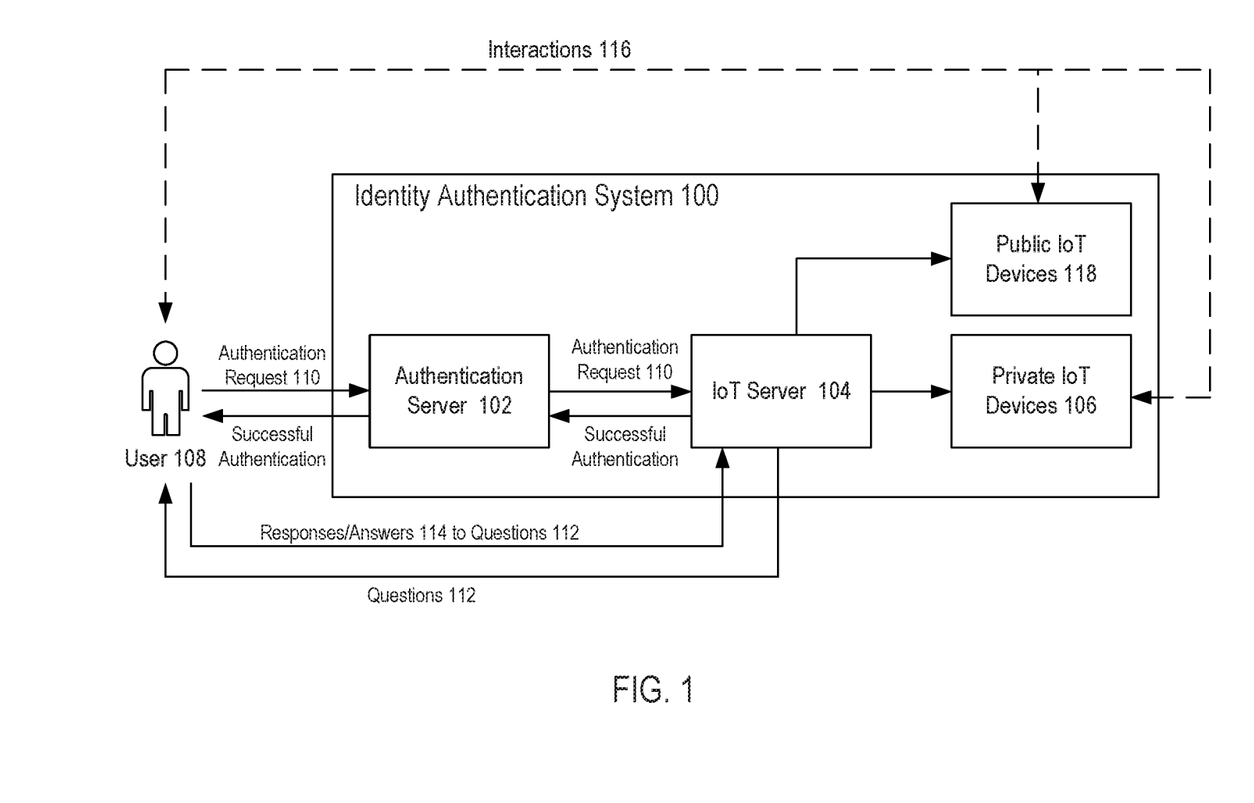
FIG. 1 depicts a schematic diagram of one illustrative embodiment of the identity authentication system 100, according to embodiments described herein.

FIG. 1 depicts a schematic diagram of one illustrative embodiment of the identity authentication system 100, according to embodiments described herein. The identity authentication system 100 includes an authentication server 102 configured to receive authentication request 110 from a user 108, a plurality of IoT devices (e.g., private IoT devices 106, public IoT devices 118), and an IoT server 104 configured to request real-time data from the registered private IoT devices 106 or public IoT devices 118, generate real-time questions/challenges from the collected real-time data, and verify responses of the user 108 to the real-time questions.

In an embodiment, the IoT devices can be private IoT devices 106, e.g., a backyard camera, a refrigerator, a toaster, a car, or/and a television set, etc. In another embodiment, the IoT devices can be commercial or public IoT devices 118, e.g., a public transport IoT device that records usage of a travel card, or a surveillance camera of a bank, etc. The public IoT devices 118 can get permission from the user 108 for identity authentication service. Upon the permission, the public IoT devices 118 can be registered with the IoT server 104.

In an embodiment, the user 108 registers available private IoT devices 106, e.g., a backyard camera, a refrigerator, a toaster, a car, and a television set, etc. to the IoT server 104. The IoT server 104 can select one or more registered private IoT devices 106 for constructing questions. In another embodiment, upon permission from the user 108, the public IoT devices 118 can be registered to the IoT server 104. The IoT server 104 can select one or more registered public IoT devices 118 for constructing questions. In another embodiment, the IoT server 104 can select a combination of private IoT devices 106 and public IoT devices 118 for constructing questions.

When the user 108 tries to authenticate himself/herself to the authentication server 102, the authentication server 102 requests the IoT server 104 to authenticate the user 108 (the authentication request 110 is forwarded to the IoT server 104). The IoT server 104 then generates questions 112 using data from the selected IoT devices, provides the generated questions 112 to the user 108, validates the answers or responses 114 by the user 108 based on the information from the selected IoT devices, and authenticates the user 108. The IoT devices can be selected by the user 108, or can be randomly selected by the IoT server 104.

The IoT devices are continuously interacting with the user 108 on a daily basis, and thus the generated questions 112 and the corresponding answers 114 based on the data from the IoT devices are dynamic, rather than static. Accordingly, strong authentication with dynamic questions 112 and answers 114 can be performed to authenticate the user 108.

Further, the generated questions and the corresponding answers are based on the knowledge that the user 108 acquired through normal interactions 116 with the IoT devices, rather than something that the user has to memorize. Further, no physical authentication devices are required to perform authentication.

In an embodiment, the IoT server 104 can keep asking questions 112 until the IoT server 104 is satisfied with the corresponding answers 114. A confidence index is introduced to indicate the matching degree between the answers provided by the user 108 and the answers known by the IoT server 104. The generated questions 112 can be asked until a confidence index threshold is reached. The confidence index and the confidence index threshold are configurable values based on the types of the IoT devices and the number of questions. Each question is assigned with a weight based on the type of the question and the importance of the question. Each answer is also assigned with a weight based on the correctness of the answer. The confidence index can be calculated using a conventional method, e.g., the confidence index can be calculated as a cumulative score=sum of products of weights for all questions (e.g., $a1*b1*c1 + a2*b2*c2 + \ldots$, where $a1, b1, c1$ are weights for answer 1 to question 1; $a2, b2, c2$ are weights for answer 2 to question 2 . . . ).

In an embodiment, the IoT server 104 can include a cognitive system, e.g., IBM Watson™ which can process human-readable language and identify inferences between text passages with human-like accuracy at speeds far faster than human beings and on a much larger scale. The cognitive system can generate questions 112 based on the real-time data available from the IoT devices and verify responses 114 of the user 108 to the real-time questions 112. In general, such cognitive systems can perform one or more of the following functions:

Ingest and process vast amounts of structured and unstructured data

Generate and evaluate hypotheses

Weigh and evaluate responses that are based only on relevant evidence

Provide situation-specific advice, insights, and guidance

Improve knowledge and learn with each iteration and interaction through machine learning processes Extend and magnify human expertise and cognition High degree of relevant recollection from data points (images, text, voice) (memorization and recall)

Figure 2:
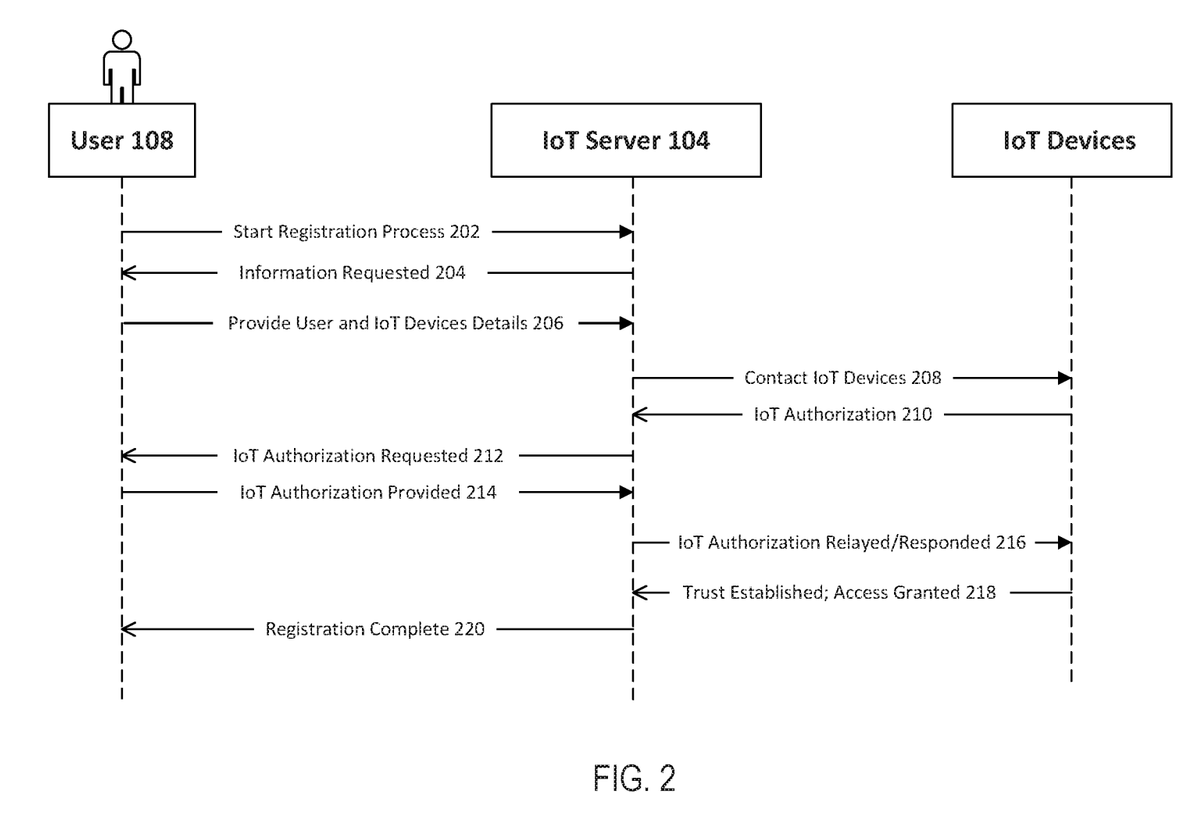
FIG. 2 depicts a flow chart of an exemplary method of registering the IoT devices, according to embodiments described herein.

Predict and sense with situation awareness that mimics human cognition based on experiences FIG. 2 depicts a flow chart of an exemplary method of registering the IoT devices, according to embodiments described herein. At step 202, the user 108 initiates a registration process. At step 204, the IoT server 104 requests information of the user 108 and information of the IoT devices from the user 108. At step 206, the user 108 provides detailed information (e.g., name, address, etc., of the user 108; and name, model, location, etc., of one or more IoT devices to be registered) to the IoT server 104. At step 208, the IoT server 104 contacts the IoT devices to be registered. At step 210, the IoT devices request the IoT server 104 to provide authorization information. At step 212, the IoT server 104 sends an authorization request to the user 108. At step 214, the user 108 provides authorization to the IoT server 104. At step 216, the authorization is relayed to the IoT devices. At step 218, the trust between the IoT server 104 and the IoT devices is established, and the IoT server 104 is authorized to access the IoT devices. At step 220, a registration completion notification is sent to the user 108.

Figure 3:
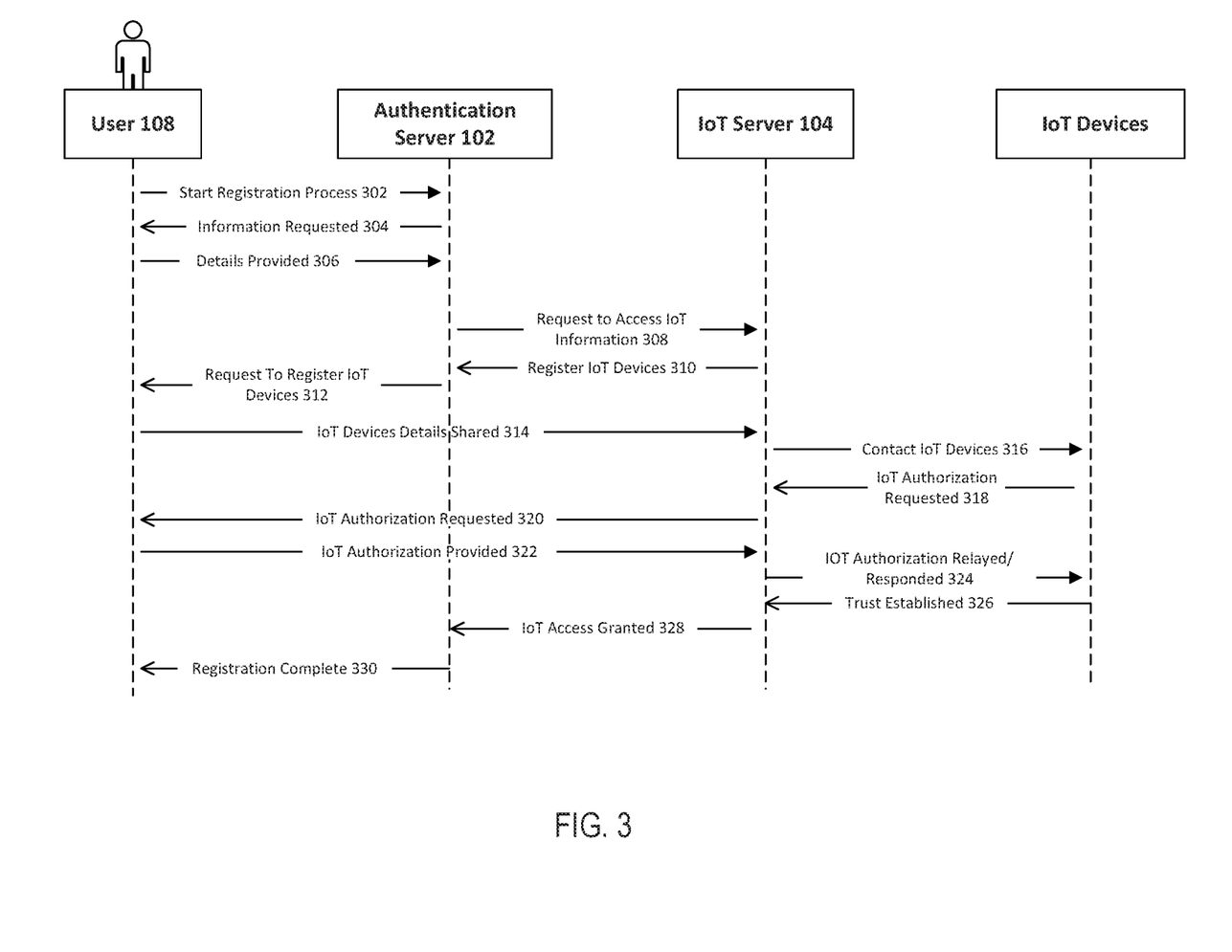
FIG. 3 depicts a flow chart of another exemplary method of registering the IoT devices, according to embodiments described herein.

FIG. 3 depicts a flow chart of another exemplary method of registering the IoT devices, according to embodiments described herein. At step 302, the user 108 initiates a registration process. At step 304, the authentication server 102 requests user information from the user 108. At step 306, the user 108 provides detailed information of the user 108 (e.g., name, address, etc., of the user 108) to the authentication server 102. At step 308, the authentication server 102 requests the IoT server 104 to provide the information of the IoT devices, so that a communication/trust can be established between the authentication server 102 and the IoT server 104. At step 310, the IoT server 104 sends a request for the IoT devices registration to the authentication server 102. At step 312, the authentication server 102 requests the user 108 to register the IoT devices. At step 314, the user 108 shares the information of the IoT devices to the IoT server 104. At step 316, the IoT server 104 contacts the IoT devices to be registered. At step 318, the IoT devices request the IoT server 104 to provide authorization information. At step 320, the IoT server 104 sends an authorization request to the user 108. At step 322, the user 108 provides authorization to the IoT server 104. At step 324, the authorization is relayed to the IoT devices. At step 326, the trust between the IoT server 104 and the IoT devices is established, and the IoT server 104 is authorized to access the IoT devices. At step 328, the IoT server 104 notifies the authentication server 102 that the access to the IoT devices has been granted. At step 330, a registration completion notification is sent to the user 108.

Figure 4:
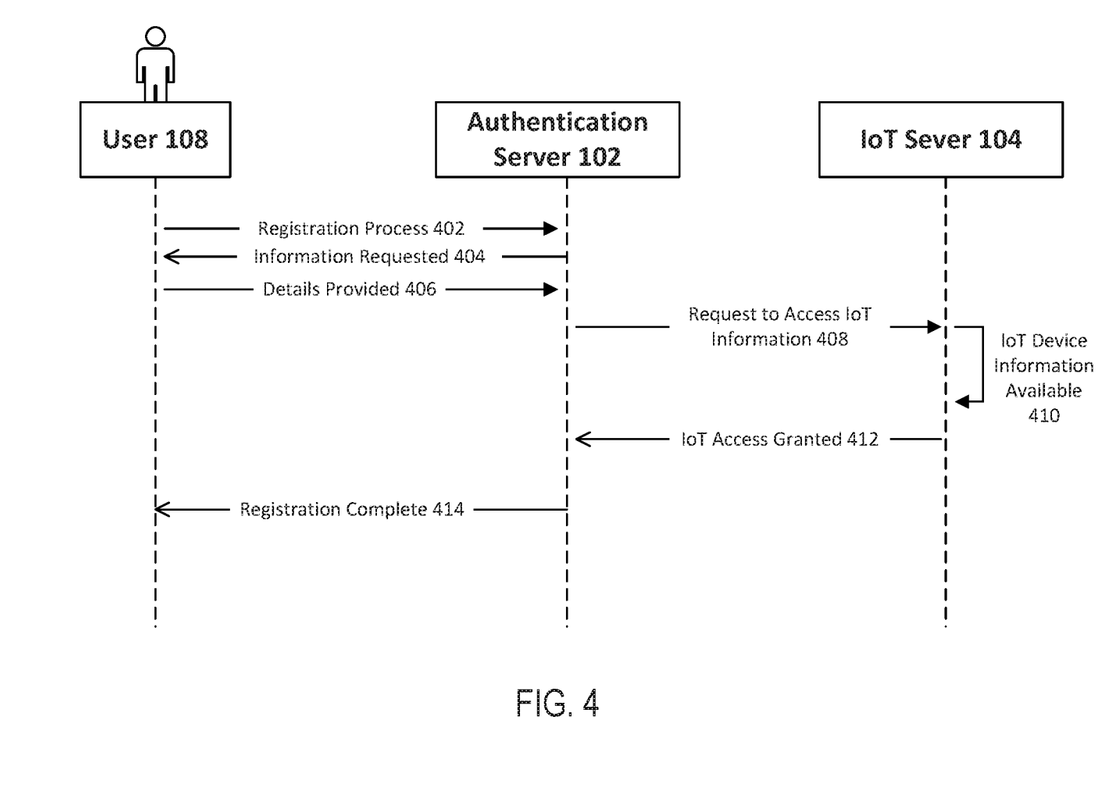
FIG. 4 depicts a flow chart of another exemplary method of registering the IoT devices, according to embodiments described herein.

FIG. 4 depicts a flow chart of another exemplary method of registering the IoT devices, according to embodiments described herein. At step 402, the user 108 initiates a registration process. At step 404, the authentication server 102 requests user information from the user 108. At step 406, the user 108 provides detailed information of the user 108 (e.g., name, address, etc., of the user 108) to the authentication server 102. At step 408, the authentication server 102 requests the IoT server 104 to provide the information of the IoT devices, so that a communication/trust can be established between the authentication server 102 and the IoT server 104. At step 410, the IoT server 104 confirms that the information of the IoT devices has already been available (i.e., the IoT devices have already been registered with the IoT server 104). At step 412, the IoT server 104 notifies the authentication server 102 that the access to the IoT devices has been granted. At step 414, a registration completion notification is sent to the user 108.

Figure 5:
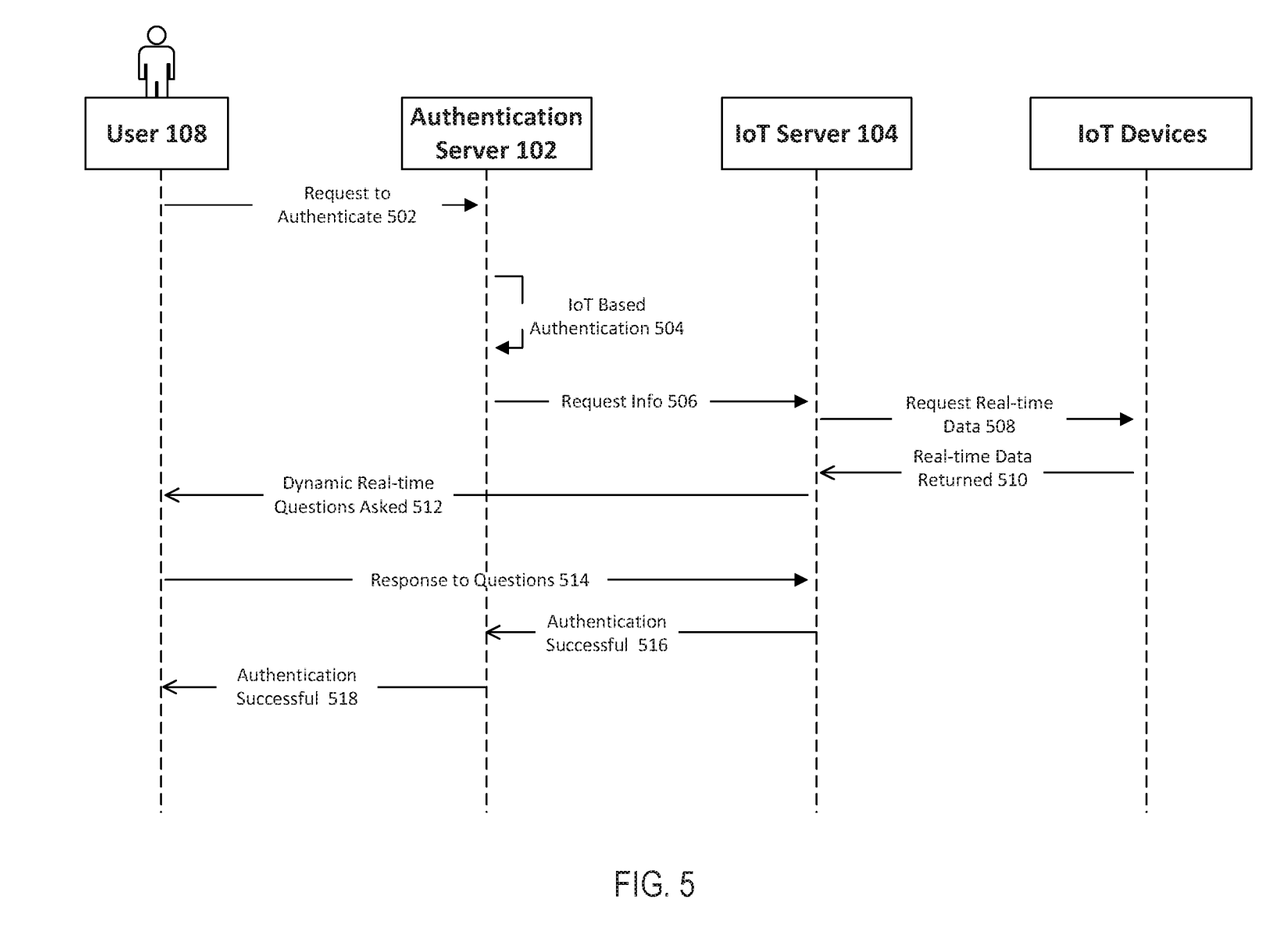
FIG. 5 depicts a flow chart of an exemplary method of authenticating a user, according to embodiments described herein.

FIG. 5 depicts a flow chart of an exemplary method of authenticating a user, according to embodiments described herein. At step 502, the user 108 requests for authentication from the authentication server 102. At step 504, the authentication server 102 identifies that the user 108 can be authenticated based on IoT. In an embodiment, IoT based authentication can be performed in combination with other factors, e.g., a password, a token, or/and a personal biometric feature. For example, a password can be authenticated after step 502. Only if the password authentication is successful, then step 504 will be performed and the IoT based authentication can be further performed. At step 506, the authentication server 102 requests the IoT server 104 to provide information about the IoT devices. At step 508, the IoT server 104 requests real-time data from the IoT devices 106 At step 510, the IoT devices return the real-time data to the IoT server 104. At step 512, The IoT server 104 can generate dynamic real-time questions to the user 108. The user 108 continuously interacts with the IoT devices, and thus the real-time data from the IoT devices is changing with the time. Accordingly, the questions generated by the IoT server 104 can be also changed with time. At step 514, the user 108 responds to the questions. The real-time data from the IoT devices is changing with the time, and thus responses, even to the same questions, are different. At step 516, if the responses from the user 108 match the correct answers known by the IoT server 104, then at step 516, the IoT server 104 notifies the authentication server 102 of the successful authentication. At step 518, the authentication server 102 notifies the user 108 of the successful authentication.

Figure 6:
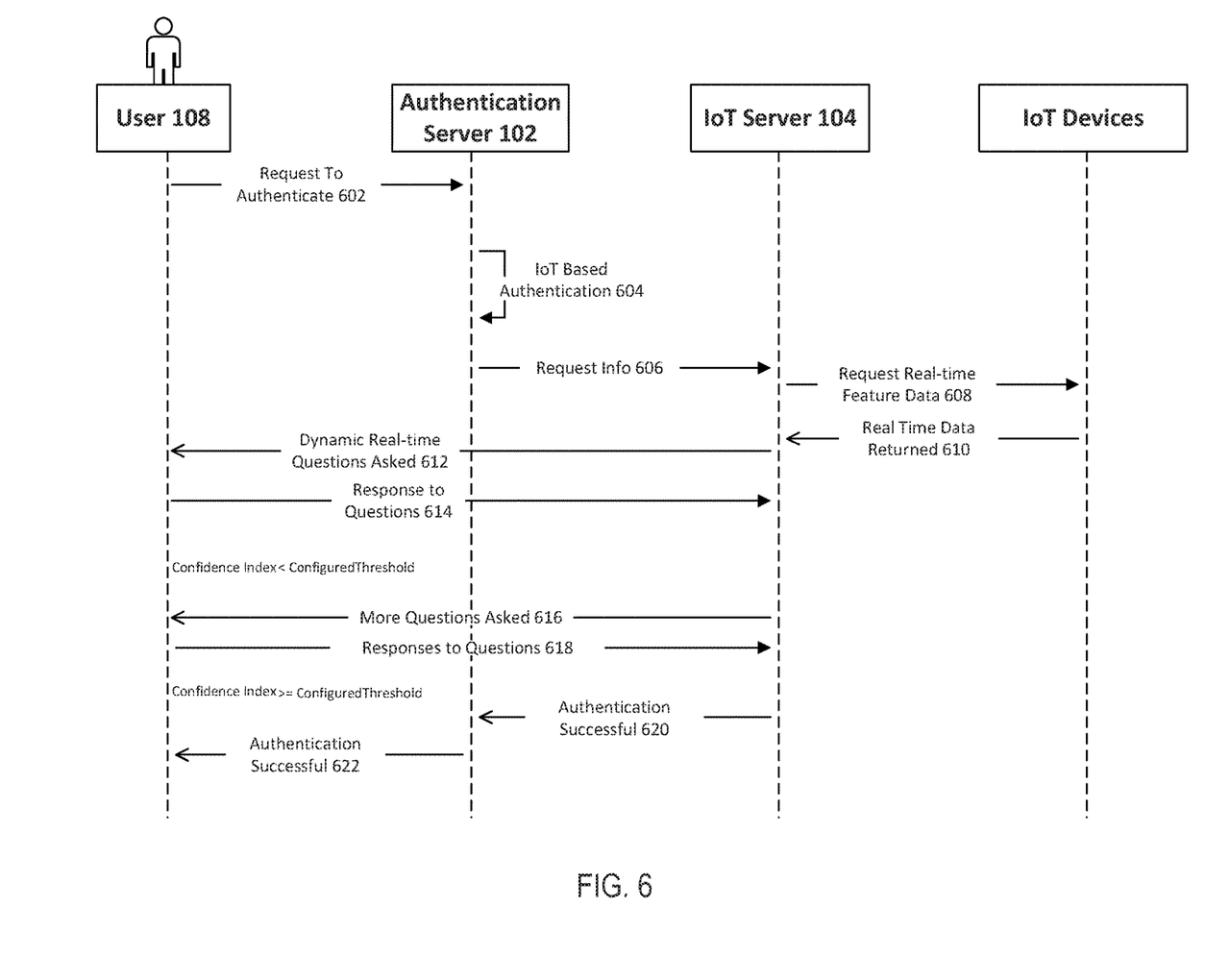
FIG. 6 depicts a flow chart of another exemplary method of authenticating a user, according to embodiments described herein.

FIG. 6 depicts a flow chart of another exemplary method of authenticating a user, according to embodiments described herein. The steps 602-614 are the same as the steps 502-514 of FIG. 5. In this embodiment, a confidence index is introduced to indicate the matching degree between the responses provided by the user 108 and the correct answers known by the IoT server 104. The generated questions 112 can be asked until a predefined confidence index threshold is reached. If the confidence index is less than the predefined confidence index threshold, then at step 616, more questions can be generated by the IoT server 104. At step 618, the user 108 responds to these questions. The steps 616 and 618 are repeated until the confidence index is equal to or more than the predefined confidence index threshold. In an embodiment, the IoT server 104 is cognitive and can utilize artificial intelligence to determine a confidence index based on answers to the generated questions. If the confidence index is below a threshold, more questions can be asked until the confidence index reaches a predefined confidence index threshold. In another embodiment, a multi-factor authentication mechanism can be used. For example, a password can be used in combination with the "IoT service." The threshold value may depend on the type of transaction, e.g., a bank transaction may have a higher threshold. When the confidence index reaches the predefined confidence index threshold, the authentication of the user 108 is successful. The steps 620 and 622 are the same as the steps 516-518 of FIG. 5.

In an embodiment, the authentication server 102 and the IoT server 104 can be implemented on two different computers, or can be implemented on the same computer.

In an example, the user 108 Alice would like to perform a transaction and thus needs to be authenticated by XYZ bank. The authentication server 102 of the XYZ bank uses a third-party entity "IoT service" to authenticate Alice. Alice has registered one or more private IoT devices 106, such as a backyard camera, a refrigerator, a toaster, a car, and a television set, etc., with the IoT server 104. In addition, Alice used a travel card to travel on public transportation and has visited the XYZ bank branch to make a financial transaction this week.

In an embodiment, the IoT server 104 generates questions based on data collected from the private IoT devices 106, e.g., "what is in the backyard next to the bin?" "around how many miles did you travel yesterday?" "how much fuel is left in the car tank?" "identify three unusual things in your fridge?" "where did I store eggs in my refrigerator?" "how much milk is in the milk bottle?" "how many coke bottles are in the refrigerator?" "what did you watch on the TV yesterday night?" "what are the last two trips you traveled in your car?"

In another embodiment, the IoT server 104 generates questions based on data collected from available public and commercial IoT devices 118, which have been already registered with the IoT server 104. For example, the question can be "where did you travel yesterday in public transport?" The user 108 used a travel card for public transportation. The IoT server 104 uses data from a public transport IoT device 118 which records usage of the travel card. For another example, the question can be "when did you last visit XYZ bank branch?" The user 108 visited the XYZ bank. The IoT server 104 uses data from a commercial IoT device 118, i.e., the XYZ bank's surveillance camera, to generate questions and validate answers. The questions can be diverse, because there can be a number of private and public IoT devices associated with the user 108 for question generation.

In an embodiment, the registered IoT devices can only be used by the authentication server 102 if Alice has configured to allow the "IoT service." The IoT server 104 will only be able to access the IoT devices when the user 108 has authorized the access. In an embodiment, the access can be a predefined limited amount of time for each authentication.

Figure 7:
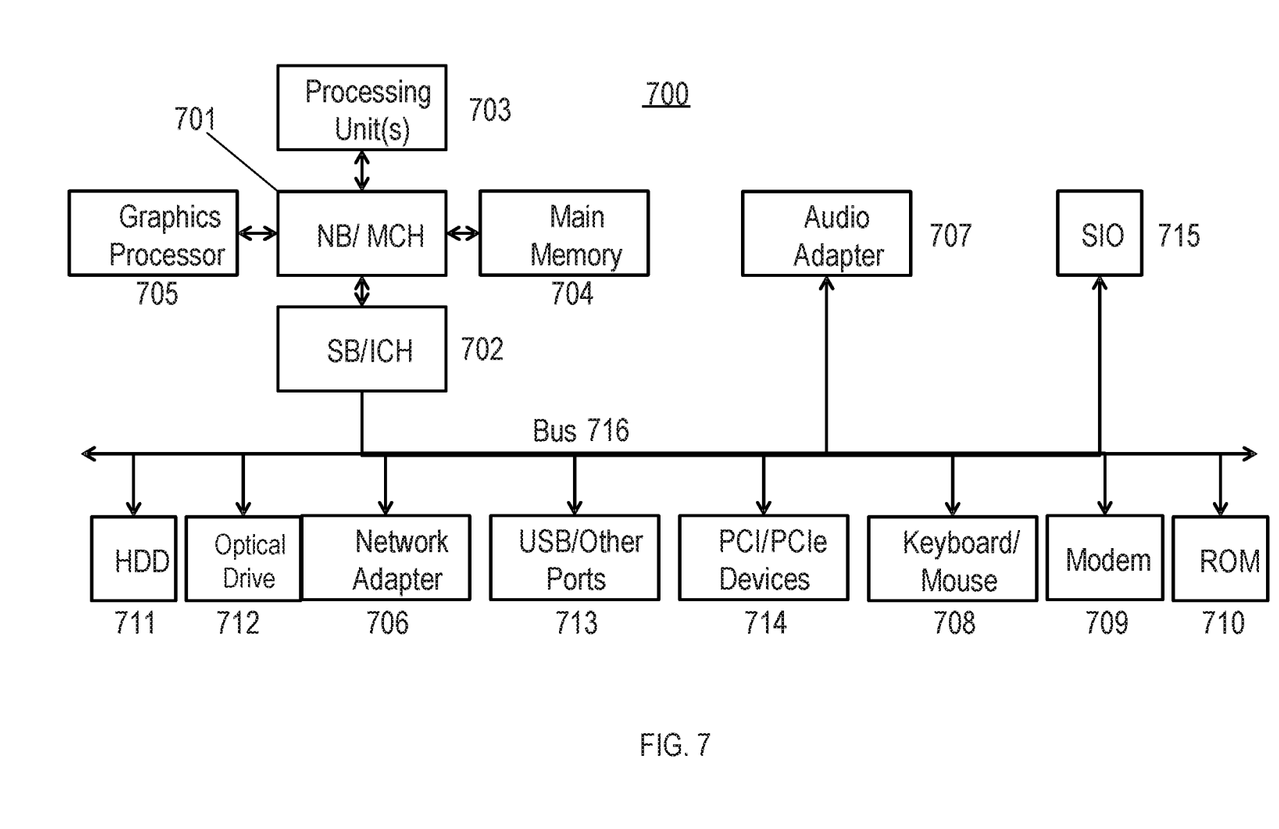
FIG. 7 is a block diagram of an example data processing system 700 in which aspects of the illustrative embodiments are implemented.

FIG. 7 is a block diagram of an example data processing system 700 in which aspects of the illustrative embodiments are implemented. Data processing system 700 is an example of a computer, such as a server or a client, in which computer usable code or instructions implementing the process for illustrative embodiments of the present invention are located. In one embodiment, FIG. 7 represents a server computing device, such as a server, which implements the identity authentication system 100 described herein.

In the depicted example, the data processing system 700 can employ a hub architecture including a north bridge and memory controller hub (NB/MCH) 701 and south bridge and input/output (I/O) controller hub (SB/ICH) 702. Processing unit 703, main memory 704, and graphics processor 705 can be connected to the NB/MCH 701. Graphics processor 705 can be connected to the NB/MCH 701 through an accelerated graphics port (AGP).

In the depicted example, the network adapter 706 connects to the SB/ICH 702. The audio adapter 707, keyboard and mouse adapter 708, modem 709, read-only memory (ROM) 710, hard disk drive (HDD) 711, optical drive (CD or DVD) 712, universal serial bus (USB) ports and other communication ports 713, and the PCI/PCIe devices 714 can connect to the SB/ICH 702 through bus system 716. PCI/PCIe devices 714 may include Ethernet adapters, add-in cards, and PC cards for notebook computers. ROM 710 may be, for example, a flash basic input/output system (BIOS). The HDD 711 and optical drive 712 can use an integrated drive electronics (IDE) or serial advanced technology attachment (SATA) interface. The super I/O (SIO) device 715 can be connected to the SB/ICH.

An operating system can run on processing unit 703. The operating system can coordinate and provide control of various components within the data processing system 700. As a client, the operating system can be a commercially available operating system. An object-oriented programming system, such as the Java™ programming system, may run in conjunction with the operating system and provide calls to the operating system from the object-oriented programs or applications executing on the data processing system 700. As a server, the data processing system 700 can be an IBM® eServer™ System p® running the Advanced Interactive Executive operating system or the Linux operating system. The data processing system 700 can be a symmetric multiprocessor (SMP) system that can include a plurality of processors in the processing unit 703. Alternatively, a single processor system may be employed.

Instructions for the operating system, the object-oriented programming system, and applications or programs are located on storage devices, such as the HDD 711, and are loaded into the main memory 704 for execution by the processing unit 703. The processes for embodiments of the full question generation system can be performed by the processing unit 703 using computer usable program code, which can be located in a memory such as, for example, main memory 704, ROM 710, or in one or more peripheral devices.

A bus system 716 can be comprised of one or more busses. The bus system 716 can be implemented using any type of communication fabric or architecture that can provide for a transfer of data between different components or devices attached to the fabric or architecture. A communication unit such as the modem 709 or network adapter 706 can include one or more devices that can be used to transmit and receive data.

Those of ordinary skill in the art will appreciate that the hardware depicted in FIG. 7 may vary depending on the implementation. For example, the data processing system 700 includes several components that would not be directly included in some embodiments of the identity authentication system 100. However, it should be understood that the identity authentication system 100 may include one or more of the components and configurations of the data processing system 700 for performing processing methods and steps in accordance with the disclosed embodiments.

Moreover, other internal hardware or peripheral devices, such as flash memory, equivalent non-volatile memory, or optical disk drives may be used in addition to or in place of the hardware depicted. Moreover, the data processing system 700 can take the form of any of a number of different data processing systems, including but not limited to, client computing devices, server computing devices, tablet computers, laptop computers, telephone or other communication devices, personal digital assistants, and the like. Essentially, data processing system 700 can be any known or later developed data processing system without architectural limitation.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a head disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN) and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present description and claims may make use of the terms "a," "at least one of," and "one or more of," with regard to particular features and elements of the illustrative embodiments. It should be appreciated that these terms and phrases are intended to state that there is at least one of the particular features or elements present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the example provided herein without departing from the spirit and scope of the present invention.

The system and processes of the Figures are not exclusive. Other systems, processes and menus may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers, and processes can be implemented using hardware components, software components, and/or combinations thereof. No claim element herein is to be construed under the provisions of 35 U.S.C. 112 (f), unless the element is expressly recited using the phrase "means for."

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed is:

1. A computer-implemented method for identity authentication in a data processing system comprising a processor and a memory comprising instructions which are executed by the processor, the method comprising:
receiving, by the processor, an authentication request from a user;
receiving, by the processor, private real-time data from a private Internet of Things (IoT) device associated with the user, wherein the private IoT device is a device registered to the user;
generating, by the processor, a first question based on the private real-time data;
receiving, by the processor, a first response to the first question from the user;
comparing, by the processor, the first response from the user with a first correct answer identified by the processor;
providing, by the processor, a first confidence index indicating a first matching degree between the first response and the first correct answer;
receiving, by the processor, public real-time data from a public Internet of Things (IoT) device associated with the user, wherein the public IoT device is a device registered to another entity that captures real time data for a plurality of users;
generating, by the processor, a second question based on the public real-time data;
receiving, by the processor, a second response to the second question from the user;
comparing, by the processor, the second response from the user with a second correct answer identified by the processor;
providing, by the processor, a second confidence index indicating a second matching degree between the second response and the second correct answer;
generating a final confidence index by combining the first confidence index and the second confidence index;
determining that the final confidence index is equal to or more than a predefined confidence index threshold; and
providing, by the processor, the user with a successful identity authentication.

2. The method of claim 1, further comprising:
registering, by the processor, the private IoT device.

3. The method of claim 2, the step of registering further comprising:
receiving, by the processor, information of the private IoT device from the user;
contacting, by the processor, the private IoT device based on the information;
receiving, by the processor, an authorization of using the private IoT device from the user;
relaying, by the processor, the authorization to the private IoT device; and
receiving, by the processor, a notification that an access to the private IoT device is granted.

4. The method of claim 2, the step of registering further comprising:
receiving, by an authentication server, information of the user;
requesting, by the authentication server, to access information of the private IoT device from an IoT server; and
if the information of the private IoT device is available from the IoT server,
receiving, by an authentication server, a notification that an access to the private IoT device is granted.

5. The method of claim 1, wherein the private IoT device is selected from a group consisting of a backyard camera, a toaster, and a car.

6. The method of claim 1, wherein the public IoT device is selected from a group consisting of a public transport IoT device that records usage of a travel card and a surveillance camera of a bank.

7. A computer program product for identity authentication, the computer program product comprising a computer readable storage medium having program instructions embodied therewith, the program instructions executable by a processor to cause the processor to:
receive an authentication request from a user;
receive private real-time data from a private Internet of Things (IoT) device associated with the user, wherein the private IoT device is a device registered to the user;
generate a first question based on the private real-time data;
receive a first response to the first question from the user;
compare the first response from the user with a first correct answer identified by the processor;
provide a first confidence index indicating a matching degree between the first response and the first correct answer;
receive public real-time data from a public Internet of Things (IoT) device associated with the user, wherein the public IoT device is a device registered to another entity that captures real time data for a plurality of users;

generate a second question based on the public real-time data;

receive a second response to the the second question from the user;

compare, by the processor, the second response from the user with a second correct answer;

providing, by the processor, a second confidence index indicating a second matching degree between the second response and the second correct answer;

generating a final confidence index by combining the first confidence index and the second confidence index;

determining that the final confidence index is equal to or more than a predefined confidence index threshold; and provide the user with a successful identity authentication.

8. The computer program product as recited in claim 7, wherein the processor is further caused to register the private IoT device.

9. The computer program product as recited in claim 8, wherein the step of registering further causes the processor to:
receive information of the private IoT device from the user;
contact the private IoT device based on the information;
receive an authorization of using the private IoT device from the user;
relay the authorization to the private IoT device; and
receive a notification that an access to the private IoT device is granted.

10. The computer program product as recited in claim 8, wherein the step of registering further causes the processor to:
receive, by an authentication server, information of the user;
request, by the authentication server, to access information of the private IoT device from an IoT server; and
if the information of the private IoT device is available from the IoT server,
receive, by an authentication server, a notification that an access to the private IoT device is granted.

11. The computer program product as recited in claim 7, wherein the private IoT device selected from a group consisting of a backyard camera, a refrigerator, a toaster, a car, and a television.

12. The computer program product as recited in claim 7, wherein the public IoT device is selected from a group consisting of a public transport IoT device that records usage of a travel card and a surveillance camera of a bank.

13. A system for identity authentication, comprising:
a processor configured to:
receive an authentication request from a user;
receive private real-time data from a private Internet of Things (IoT) device associated with the user, wherein the private IoT device is a device registered to the user;
generate a first question based on the private real-time data;
receive a first response to first question from the user;
compare first response from the user with a first correct answer identified by the processor;
provide a first confidence index indicating a first matching degree between the first response and the first correct answer;
receive, by the processor, public real-time data from a public Internet of Things (IoT) device associated with the user, wherein the public IoT device is a device registered to another entity that captures real time data for a plurality of users;
generate a second question based on the public real-time data;
receive a second response to the second question from the user;
compare, by the processor, the second response from the user with a second correct answer identified by the processor;
provide, by the processor, a second confidence index indicating a second matching degree between the second response and the second correct answer;
generate a final confidence index by combining the first confidence index and the second confidence index;
determine that the final confidence index is equal to or more than a predefined confidence index threshold; and
provide the user with a successful identity authentication.

14. The system as recited in claim 13, wherein the processor is further configured to register the private IoT device.

15. The system as recited in claim 14, wherein the step of registering further configures the processor to:
receive information of the private IoT device from the user;
contact the private IoT device based on the information;
receive an authorization of using the private IoT device from the user;
relay the authorization to the private IoT device; and
receive a notification that an access to the private IoT device is granted.

16. The system as recited in claim 14, wherein the step of registering further configures the processor to:
receive, by an authentication server, information of the user;
request, by the authentication server, to access information of the private IoT device from an IoT server; and
if the information of the private IoT device is available from the IoT server,
receive, by an authentication server, a notification that an access to the private IoT device is granted.

17. The system as recited in claim 13, wherein the private IoT device is selected from a group consisting of a backyard camera, a refrigerator, a toaster, a car, and a television.

18. The system as recited in claim 13, wherein the public IoT device is selected from a group consisting of a public transport IoT device that records usage of a travel card and a surveillance camera of a bank.

* * * * *